(12) United States Patent
Pfeiffer et al.

(10) Patent No.: US 8,463,542 B2
(45) Date of Patent: Jun. 11, 2013

(54) METHOD FOR LOCALIZATION OF A ROUTE SECTION IN A MAP

(75) Inventors: Heinz-Werner Pfeiffer, Hohenhameln (DE); Maylin Wartenberg, Braunschweig (DE)

(73) Assignee: Robert Bosch GmbH, Stuttgart (DE)

( * ) Notice: Subject to any disclaimer, the term of this patent is extended or adjusted under 35 U.S.C. 154(b) by 418 days.

(21) Appl. No.: 11/991,335

(22) PCT Filed: Nov. 22, 2006

(86) PCT No.: PCT/EP2006/068759
§ 371 (c)(1),
(2), (4) Date: Jul. 19, 2010

(87) PCT Pub. No.: WO2008/061561
PCT Pub. Date: May 29, 2008

(65) Prior Publication Data
US 2010/0312463 A1 Dec. 9, 2010

(51) Int. Cl.
*G01C 21/00* (2006.01)
(52) U.S. Cl.
USPC .......................................... 701/410

(58) Field of Classification Search
USPC .................. 701/400, 409, 410, 533
See application file for complete search history.

(56) References Cited

U.S. PATENT DOCUMENTS
2005/0049783 A1* 3/2005 Hunzinger .................. 701/208

FOREIGN PATENT DOCUMENTS
| EP | 1 719 976 | 11/2006 |
| JP | 2004-264326 | 9/2004 |
| JP | 2005-78066 | 3/2005 |

* cited by examiner

*Primary Examiner* — Kim T Nguyen
(74) *Attorney, Agent, or Firm* — Kenyon & Kenyon LLP

(57) ABSTRACT

A method for the localization of a certain route section from a first digitized map in a second digitized map. An origin root point is established with regard to a route section in the first map, and the coordinates of this origin root point are determined. Starting from the origin root point, an origin tree structure is generated from a plurality of branches. A reference root point is established in the second map in the vicinity of the coordinates of the origin root point, and in a similar way, a reference tree structure is generated, starting from the reference root point, from a plurality of branches on which tree points are situated in such a way that they correspond in each case to a point of a traffic route in the second map.

12 Claims, 4 Drawing Sheets

METHOD FOR LOCALIZATION OF A ROUTE SECTION IN A MAP

FIELD OF THE INVENTION

The present invention relates to a method for the localization of a certain route section from a first digitized map of a traffic-route network in a second digitized map of a traffic-route network.

BACKGROUND INFORMATION

Navigation systems access digitized maps of the traffic-route network or road network as the basis for vehicle navigation. These maps are not standardized, so that in response to maps from different producers, deviations in the digitized map information may come about.

In a dynamic navigation that is usual these days, the navigation system checks the route that has already been computed, based on received traffic data on the current traffic position, or it is computed again while taking into account the changed traffic situation. Traffic data are usually allocated to certain route sections of the traffic-route network, in order to make the localization possible. The navigation system now has uniquely to localize the route section of localized in the map available to it, in order to be able to take into consideration the received traffic message in the route computation. This localization is also designated as referencing.

In the referencing of parts of the traffic-route network, coordinates of (shape) points of the route sections are essentially coded on an encoder side, which has a first digitized map, and transmitted to the decoder system, together with certain attributes, which accesses a second digitized map. The corresponding route section is identified on the decoder side, with the aid of these coordinates and attributes. These coordinates that are to be transmitted are selected partially to be equidistant and partially with the aid of certain algorithms, such as the Douglas-Peuker algorithm. A correlation with the data of the receiver map is then computed for the decoding, the transmitted coordinates being shifted within a certain framework. In the case of a maximum, a correct shifting is assumed, which is verified with the aid of the attributes. Consequently, a unique identification of the route section has been made possible.

The decoding is often insufficient without the use of further attributes, since, for example, parallel roadways cannot be distinguished. But even when further attributes are used, such as the direction of travel and the like, it often happens that a unique maximum cannot be determined. In addition, routing through the correlated points increases the runtime of the decoder. This is required, however, since, during the correlating of the points in the first step, the topology cannot be taken into account. As a result, it may happen that points which are really adjacent, turn up on different roads of the road network. Furthermore, on account of the many points that are to be transmitted, the volume of data rapidly becomes quite large, but for correct identification, a plurality of points is indispensable in the case of some roads.

SUMMARY OF THE INVENTION

Accordingly, an object of the exemplary embodiments and/or exemplary methods of the present invention is to provide an improved method for identifying the correct route sections in a digitized map.

This object may be attained by a method having the features described herein.

According to the exemplary embodiments and/or exemplary methods of the present invention, in a method of this type, an origin root point is established with regard to a route section in the first map, and the coordinates of this origin root point are determined. Starting from the origin root point, an origin tree structure is generated from a plurality of branches, on which tree points are situated in such a way that they correspond in each case to a point in a traffic route in the first map. A reference root point is established in the second map in the vicinity of the coordinates of the origin root point, and in a similar way, a reference tree structure is generated, starting from the reference root point, from a plurality of branches on which tree points are situated, in such a way that they correspond in each case to a point of a traffic route in the second map. The origin tree structure and the reference tree structure are compared to each other and a further reference root point is established for the generation of a further reference tree structure, until a certain agreement is achieved of the reference tree structure with the origin tree structure. Subsequently, the route section is determined with respect to the reference root point in the second map with the aid of the reference of the route section to the origin root point in the first map.

By the formation of the tree structure, the corresponding section of the traffic-route network in the first map, which includes the route section that is to be looked for, is mapped in a representation that is solved by the map data and abstracted. Slight deviations of the traffic-route network in the different digitized maps thus effect only a minimal change in the respective tree structure. Since an exactly equal tree structure is possible only for identical map data and in response to an identical root point, an agreement of the two tree structures within a certain measure of deviations is sufficient for the comparison, according to the exemplary embodiments and/or exemplary methods of the present invention, of the reference tree structure with the origin tree structure. Consequently, the map data are able to be compared to one another section by section, in order to localize a specific route section of the traffic-route network in both map representations.

The origin root point and/or the reference root point may each correspond to a point in the traffic-route network. In this way it is achieved that all the points defining the tree structure lie on one road or one traffic route.

In order for the tree structures with regard to the first map and the second map to be simpler to compare to each other, it is provided, in an advantageous manner, that the tree points are established in such a way that the points of the traffic route corresponding to the tree points have a specific route distance from other points of the traffic route, which correspond to the root points or other points, for instance, adjacent tree points.

The route separation distances may be predetermined, in an advantageous manner. Alternatively, the route separation distances may be determined as a function of the length of the route section. By this it is achieved that the extension of the tree structure has in each case a certain relationship to the extension of the route section that is to be identified.

In order also to be able to identify parallel roadways correctly, only tree points may be taken into consideration which are able to be reached, starting from the corresponding root points. That is, in this case, turnoff rules, regulated travel directions (one-way road) and further traffic regulations are taken into account.

Furthermore, it is advantageous only to take into account tree points which correspond to points on traffic routes of certain classes of traffic routes. This avoids a complicated tree structure based on many tree points on side roads that may possibly be present.

The origin tree structure may be coded in binary fashion and transmitted. This opens up the possibility of reducing the data volume that is to be transmitted.

The exemplary embodiments and/or exemplary methods of the present invention is explained in greater detail with reference to the attached drawings.

DETAILED DESCRIPTION

Figure 1:
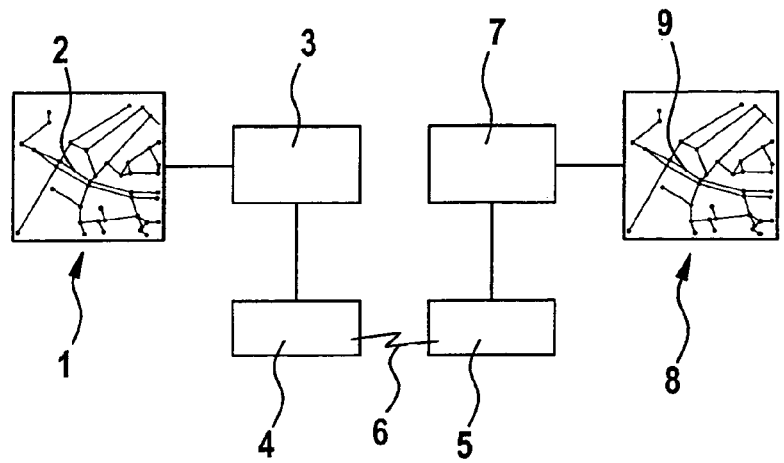
FIG. 1 shows a schematic sketch of two map illustrations which are being compared to each other.

FIG. 1 shows a map illustration 1, in which there is a route section 2 of a section of a traffic network or road network which is to be localized. An application 3, such as a traffic control center, accesses map illustration 1, for instance, to report a traffic jam and/or a construction site in this route section 2. Additional possible applications of the method according to the present invention might be the referencing of points of interest, for example, the location of restaurants and/or hotels, or the insertion of new map data into digitized maps. Application 3 codes the corresponding road information, using the method according to the present invention described below, for identifying road section 2, and passes the coded data on to a suitable transmission device 4.

Transmission device 4 then transmits the coded road data to a receiving device 5. The transmission, shown in FIG. 1 by a jagged arrow 6, may be a wireless radio transmission, for instance, via digital transmission system for VHF transmitter RDS (radio data system). The transmission may also be made via DAB (digital audio broadcasting), the Internet or a telecommunications connection.

Receiving device 5 conducts the coded data on to application 7, which decodes the received data. Application 7 accesses a road map 8 in order to localize corresponding route section 9 in this map 8. Application 7 may be a navigation system, for example, which is now put into a position of taking into account the traffic report in route planning and route guidance.

Figure 2:
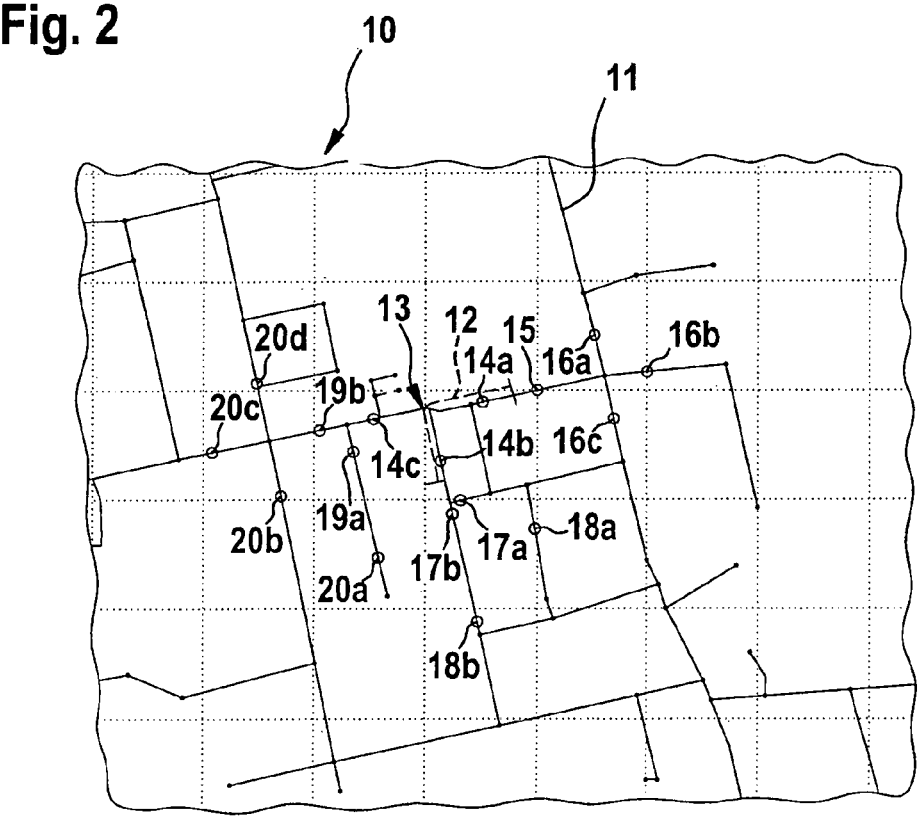
FIG. 2 shows schematically a section of a first map having a selected route section.
Figure 3:
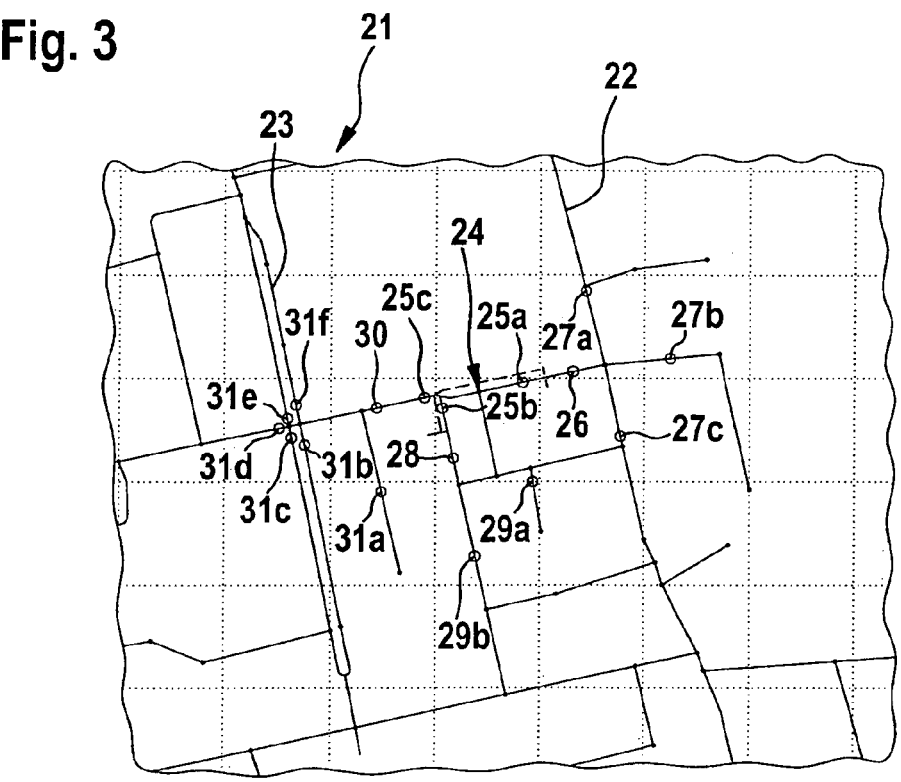
FIG. 3 shows a section from a second map for the localization of the route section from FIG. 2.
Figure 4:
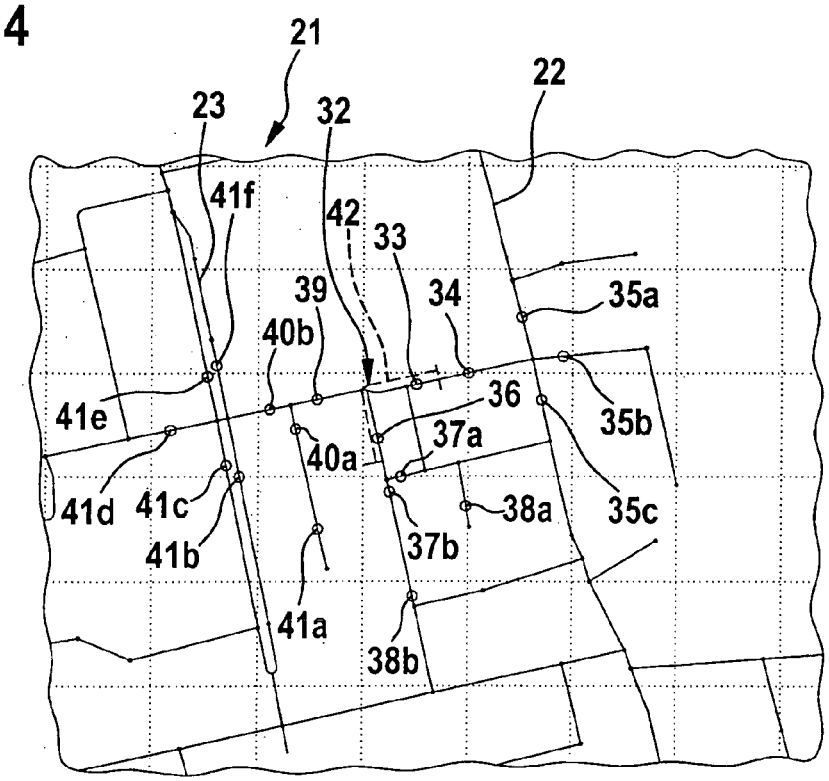
FIG. 4 shows a section from a second map for the localization of the route section from FIG. 2.

FIG. 2 shows a schematic and enlarged section of a first map 10 having a road network 11. In road network 11, a dashed line marks a road section 12 that is to be localized in another map (FIG. 3 or 4). Within route section 12, an origin root point 13 is first established which corresponds to a crossing in road network 11. Origin root point 13 may lie on a crossing or at least in the vicinity of a crossing, since the characteristics of the tree structure rises with the number of the roads that cross one another. However, any other point on a road, or off to one side from it, may be selected.

Starting from origin root point 13, a tree point 14a is first established which corresponds to a point on road network 11, which is at a certain distance from origin root point 13. Starting from tree point 14a, in a similar way a tree point 15 is then established, and in the next step, tree points 16b, 16c and 16a are established. In the selection of the tree points, from an imaginary line towards north, the tree points are selected one after the other in the clockwise direction.

When a branch line has reached the last tree point, in this example tree point 16a, an additional tree point is established in the clockwise direction, in this example 16b, from the next tree point back, in this case tree point 16a. These steps are repeated until no further tree point is able to be reached from tree point 16a.

Tree points 16a, 16b, and 16c in each case correspond to road points that are all at the same distance from the road point corresponding to origin root point 13. A first branch for the origin tree structure is generated by a stepwise connection of origin root point 13 via tree point 14a to tree points 16 and subsequently on to tree points 16a, 16 b and 16c.

In a comparable manner, starting from origin root point 13, a second branch of the tree structure is now generated using tree points 17a and 17b, as well as 18a and 18b. A third branch of the tree structure being created has tree points 19a and 19b, as well as four closing tree points 20a, 20b, 20c and 20d. The tree structure generated in this way is sketched in FIG. 5a. For reasons of clarity, only origin root point 13 is marked. The individual tree points are connected to one another without paying attention to the road network on which this is based, whereby a representation is obtained that is solved by the road network and is abstracted.

For the construction of the tree structure, after the selection of the origin root point, a tree point is set at certain distances on branching-off roads. The separation distances selected may be, for instance, 50 m, 100 m and 200 m, as measured from the root point. Now the tree structure may be suitably coded by, for instance, starting from origin root point 13, having all branches, one after the other, paced off up to the respective end points 16a to 16c, 18a and 18b, as well as 20a to 20d, and for each step moving away, a 1 is noted down and for each step going back to origin root point 13, a 0 is noted down.

In this example, this leads to a 1 for the step from origin root point 13 to first tree point 14a, and twice to an additional 1 in order to reach tree point 16a via tree point 15. From tree point 16a one has to go back to tree point 15, for which a 0 is noted down. In order successively to reach tree points 16b and 16c, sequence 101 is established. Using three further steps back, that is, three times successively a 0, one returns again to origin root point 13. In the same way the two additional branches are now paced off, until finally one has arrived again at origin root point 13. The overall sequence, in this example, comes out to: 111010100011100110001110011010101000.

This string is transmitted for the delimitation of route section 12, together with the geocoordinates of origin root point 13 and perhaps further attributes and length statements.

FIG. 3 shows a section of a second map 21, which essentially corresponds to map section 10 in FIG. 2, but which has deviations from road network 11 in the representation of road network 22. Thus, road 23 is developed having 2 lanes in this map section 21, whereas it is shown as one lane in map section 10 in FIG. 2. Further deviations between the two road networks 11 and 22 may be seen in the respective figures.

Since the geocoordinates of origin root point 13 were transferred from FIG. 2, a reference root point 24 is now established in map section 21 of FIG. 3 which is in the vicinity of the transferred geocoordinates. Starting from reference root point 24, a second tree structure having tree points 25a, 25b and 25c is now constructed, in the manner described with reference to FIG. 2, which are approximately equivalent to tree points 14a, 14b and 14c in FIG. 2.

Starting from tree point 25a, this first branch is continued using tree points 26, 27a, 27b and 27c. The second branch beginning with tree point 25b is continued with tree points 28, 29a and 29b. Finally, the third branch is continued, beginning with tree point 25c, with tree points 30, 31a, 31b, 31c, 31d, 31e and 31f. The generated tree structure is sketched in FIG. 5b. A comparison of the origin tree structure of FIG. 5a to the reference tree structure of FIG. 5b yields clear deviations, so that no sufficient agreement of the tree structures was achieved.

In FIG. 4, map section 21 is shown in turn with road network 22 of FIG. 3. In FIG. 4 an additional reference root point 32 is now established on road network 22, starting from which, an additional, third tree structure is generated. The third tree structure has a first branch having tree points 33, 34 and 35a, 35b and 35c. The second branch has tree points 36, 37a, 37b, 38a and 38b. Finally, the third branch has tree points 39, 40a and 40b, as well as 41a, 41b, 41c, 41d, 41e and 41f.

Figure 5A:
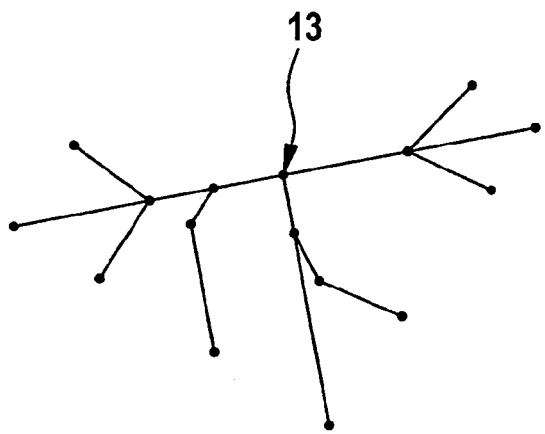
FIG. 5a shows a sketch of the tree structures of FIG. 2.
Figure 5B:
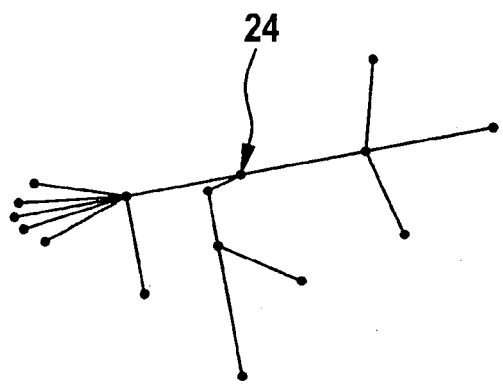
FIG. 5b shows a sketch of the tree structures of FIG. 3.
Figure 5C:
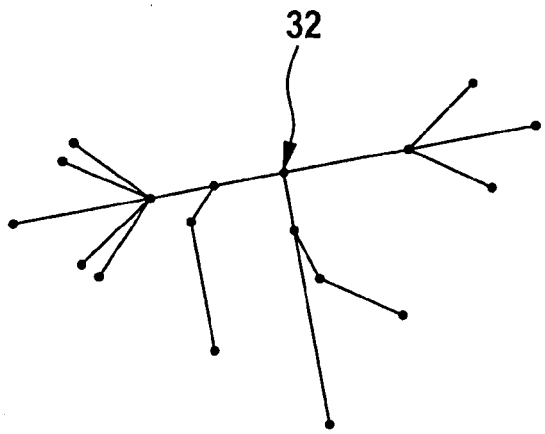
FIG. 5c shows a sketch of the tree structures of FIG. 4.

The third generated tree structure is sketched in FIG. 5c. A comparison of the tree structure in FIG. 5c to the tree structure of FIG. 5a shows that the respectively first branches to be almost identical, and the third branch has a slight deviation only in the end region. This deviation may be attributed to the fact that road 23 in FIGS. 3 and 4 is being taken into account as having two lanes, whereas the corresponding road is shown in the illustration in FIG. 2 as having one lane.

Subsequently, route section 42 is determined with respect to reference root point 32 in FIG. 4, with the aid of the reference of route section 12 to origin root point 13 in FIG. 2.

In the case of roads having two parallel lanes for opposite travel directions, in order to be able to identify clearly a road section relating to only one lane, when generating a tree structure, one may set a tree point only if the corresponding point of the road is able to be reached or driven to even taking into account regulations on turning-off rules and other traffic rules. In addition, the selection of the tree points may be limited to the extent that only roads of an equivalent or higher class of road are taken into consideration in response to increasing distance from the root point. That avoids a complicated tree structure, based on smaller and possibly unimportant side roads.

In addition, if the referenced route sections are not present in the second map, or the decoder map, a region may be stated, for instance, with the aid of grid elements to be transmitted, in which the route section, that is sought, is located. This makes possible a supplementation of the map data on the decoder side, by an identification of the bordering roads, without having to transmit a very large data volume. This supplementation will be elucidated in greater detail with the aid of FIGS. 6 and 7.

Figure 6:
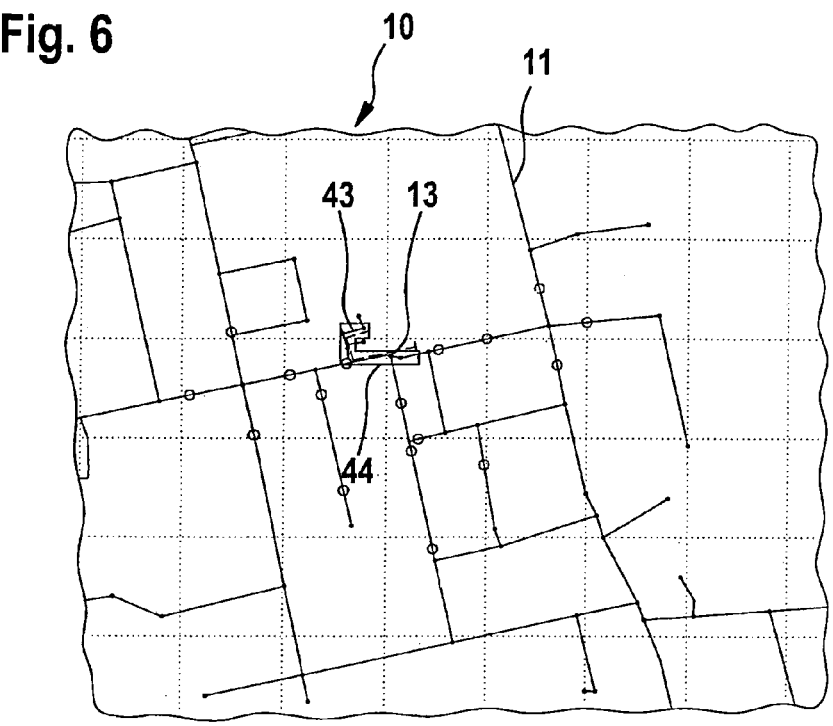
FIG. 6 shows the section of the first map by a further exemplary route section.
Figure 7:
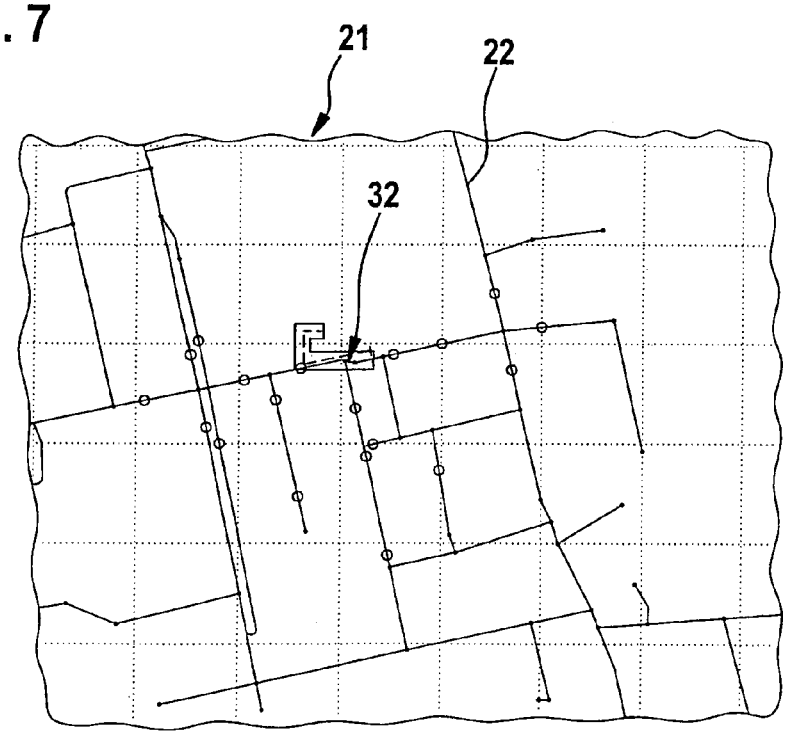
FIG. 7 shows the corresponding map section of the second map for the localization of the route section of FIG. 6.

FIG. 6 shows map section 10 with traffic network 11 of FIG. 2. Road network 11 has a side road arrangement 43 that is approximately F-shaped. In FIG. 6, a tree structure is again generated starting from origin root point 13. This tree structure essentially corresponds to the tree structure sketched in FIG. 5a. FIG. 7 reproduces map section 21 with road network 22. It will be clearly recognized that side road arrangement 43 from FIG. 6 is not present in FIG. 7.

Based on the transmitted coordinates of origin root point 13, a reference root point 32 is determined in map section 21, starting from which a tree structure is able to be generated that sufficiently agrees with the tree structure. The map information present in grid 44 may subsequently be laid onto road network 22 of FIG. 7. This consequently makes possible supplementation of map 21 shown in FIG. 7.

What is claimed is:

1. A computer-implemented method for localizing a certain route section from a first digitized map of a traffic-route network in a second digitized map of the traffic-route network, the method comprising:

establishing, by a processor, an origin root point with regard to the route section in the first map and determining coordinates of the origin root point;

starting, by the processor, from the origin root point, and generating an origin tree structure from a plurality of branches, on which tree points of the origin tree are situated so that the tree points of the origin tree correspond in each case to a point in a traffic route in the first map;

establishing, by the processor, a reference root point in the second map in a vicinity of the coordinates of the origin root point, and generating a reference tree structure, starting from the reference root point, from a plurality of branches on which tree points of the reference tree are situated so that the tree points of the reference tree correspond in each case to a point of a traffic route in the second map;

comparing, by the processor, the origin tree structure and the reference tree structure and establishing a further reference root point, until a certain agreement of the reference tree structure with the origin tree structure is achieved; and determining, by the processor, the route section with respect to the reference root point in the second map with the aid of the reference of the route section to the origin root point in the first map;

wherein only tree points are taken into consideration which correspond to points on traffic routes of certain classes of traffic routes.

2. The method of claim 1, wherein at least one of the origin root point and the reference root point each correspond to a point in the traffic route.

3. The method of claim 1, wherein the tree points of one of the origin tree and the reference tree are established so that the points of one of the origin tree and the reference tree of the traffic route corresponding to the tree points of one of the origin tree and the reference tree have a certain route distance from the points of the traffic route that correspond to the root points of one of the origin tree and the reference tree or other tree points of one of the origin tree and the reference tree.

4. The method of claim 3, wherein the route separation distances are predetermined.

5. The method of claim 3, wherein the route separation distances are determined as a function of a length of the route section.

6. The method of claim 1, wherein only tree points of one of the origin tree and the reference tree are taken into consideration which are reachable starting from the corresponding root points of one of the origin tree and the reference tree.

7. The method of claim 1, wherein the origin tree structure is binarily coded and transmitted.

8. The method of claim 1, wherein at least one of the origin root point and the reference root point each correspond to a point in the traffic route, and wherein the tree points of one of the origin tree and the reference tree are established so that the points of one of the origin tree and the reference tree of the traffic route corresponding to the tree points of one of the origin tree and the reference tree have a certain route distance from the points of the traffic route that correspond to the root points of one of the origin tree and the reference tree or other tree points of one of the origin tree and the reference tree.

9. The method of claim 8, wherein the route separation distances are predetermined.

10. The method of claim 8, wherein the route separation distances are determined as a function of a length of the route section.

11. The method of claim 8, wherein only tree points of one of the origin tree and the reference tree are taken into consideration which are reachable starting from the corresponding root points of one of the origin tree and the reference tree.

12. The method of claim 8, wherein the origin tree structure is binarily coded and transmitted.

* * * * *

UNITED STATES PATENT AND TRADEMARK OFFICE
CERTIFICATE OF CORRECTION

PATENT NO. : 8,463,542 B2  
APPLICATION NO. : 11/991335  
DATED : June 11, 2013  
INVENTOR(S) : Pfeiffer et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 842 days.

Signed and Sealed this
Eighth Day of September, 2015

Michelle K. Lee
*Director of the United States Patent and Trademark Office*